L. L. DEWEESE.
NUT LOCK.

No. 91,724.  Patented June 22, 1869.

United States Patent Office.

LEVI L. DEWEESE, OF CANTON, OHIO.

Letters Patent No. 91,724, dated June 22, 1869.

IMPROVEMENT IN NUT-LOCK.

The Schedule referred to in these Letters Patent and making part of the same.

*To all whom it may concern:*

Be it known that I, LEVI L. DEWEESE, of Canton, in the county of Stark, and in the State of Ohio, have invented new and useful Improvements in Bolt and Nut-Fastenings; and do hereby declare that the following is a full, clear, and exact description thereof, reference being had to the accompanying drawings, and to the letters of reference marked thereon.

The nature of my invention consists in the construction and arrangement of a "bolt and nut-fastening," whereby the nut will become perfectly secure, so that it cannot, in any possible way, work loose.

In order to enable others skilled in the art to which my invention appertains, to make and use the same, I will now proceed to describe its construction and operation, referring to the annexed drawings, which form a part of this specification, and in which—

A represents a screw-bolt, of any size and dimensions, having a longitudinal groove, $a$, along the entire screw-portion of the bolt.

The washer B is made of a plate, with a hole of such size as to fit over or around the bolt A.

In this hole projects a tongue, $b$, of such size as to fit in the groove $a$, on the bolt.

Figure 1:
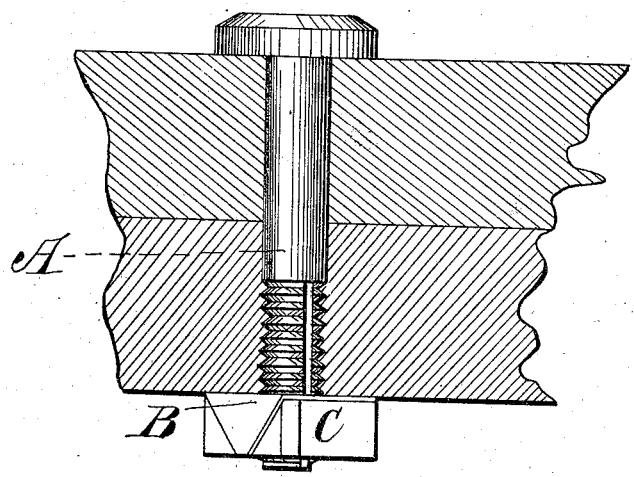
Figure 1 is a side elevation of the bolt and nut fastened by my device.
Figure 2:
Figure 2 is a plan view of the washer.

One end of the washer B projects a suitable distance beyond the bolt, and is pointed, as shown in fig. 2.

When the bolt A has been inserted in its place, the washer B is slipped on the same, the tongue $b$ extending into the groove $a$.

The nut C is then placed on the bolt, and tightened, when the pointed projecting end of the washer is bent downward along the side of the nut.

By this means, it will be found impossible to turn the nut C, without first bending the washer back again, and, consequently, the nut cannot work loose, thus making a complete and perfect, though simple, nut-lock.

Having thus fully described my invention,

What I claim as new, and desire to secure by Letters Patent, is—

The arrangement of the longitudinally-grooved bolt A, washer B, tongue $b$, and nut C, all substantially as shown and described.

In testimony that I claim the foregoing, I have hereunto set my hand, this 11th day of March, 1869.

LEVI L. DEWEESE.

Witnesses:
GEO. E. BALDWIN,
W. H. WYANT.